United States Patent [19]

Hudson et al.

[11] Patent Number: 5,630,490
[45] Date of Patent: May 20, 1997

[54] TORQUE LIMITER

[75] Inventors: Philip Hudson, Wolverhampton; Stephen H. Davies, Telford, both of England

[73] Assignee: Lucas Industries public limited company, West Midlands, England

[21] Appl. No.: 601,996

[22] Filed: Feb. 15, 1996

[30] Foreign Application Priority Data

Feb. 18, 1995 [GB] United Kingdom ............ 9503191

[51] Int. Cl.$^6$ .............................. F16D 7/08; F16D 67/02
[52] U.S. Cl. ............... 192/7; 192/15; 192/56.54; 188/134
[58] Field of Search .................. 192/7, 8 R, 15, 192/18 R, 56.51, 56.52, 56.53, 56.54, 114 R, 144, 150; 188/134, 265; 464/36, 39

[56] References Cited

U.S. PATENT DOCUMENTS

| | | | |
|---|---|---|---|
| 3,367,456 | 2/1968 | Bohnhoff | 192/7 X |
| 3,542,162 | 11/1970 | Kerr et al. | 192/7 X |
| 3,596,740 | 8/1971 | Nau | 192/8 R X |
| 4,142,616 | 3/1979 | Dekoninck | 192/56.54 |
| 4,176,733 | 12/1979 | Twickler | 192/8 R X |
| 4,597,477 | 7/1986 | Miller | 192/8 R |
| 4,898,265 | 2/1990 | Metcalf | 192/8 R |
| 5,199,538 | 4/1993 | Fischer et al. | 192/7 |

FOREIGN PATENT DOCUMENTS

| | | |
|---|---|---|
| 0168124B1 | 12/1988 | European Pat. Off. . |
| 979487 | 1/1965 | United Kingdom . |

*Primary Examiner*—Richard M. Lorence
*Attorney, Agent, or Firm*—Trexler, Bushnell, Giangiorgi & Blackstone, Ltd.

[57] ABSTRACT

A torque limiter comprises input and output shafts connected together by a clutch which disengages to prevent excessive torque from being applied to the output shaft and to allow the input shaft to rotate freely. As the clutch disengages, a brake is applied to the output shaft to prevent it from rotating. When the brake is applied, a latch holds the brake on. The clutch comprises balls which are held in clutch plate recesses to transmit torque but which ride out of the recesses and fall into pockets so that the clutch becomes permanently disengaged.

6 Claims, 1 Drawing Sheet

TORQUE LIMITER

The present invention relates to a torque limiter.

Torque limiters are provided to prevent excessive torques being transmitted from a drive shaft to a component such as an actuator.

EP-B-0 168 124 discloses a torque limiter which applies a brake to an output shaft thereof in response to excessive torque. Once the torque overload has subsided, the brake is released and driving engagement is re-established.

GB 979 487 discloses an overload clutch comprising a torque limiter having input and output clutch members which are disconnected in response to excessive torque. Torque transmitting balls normally engage in openings in the clutch members but are permitted to move out of engagement with the torque transmitting openings in response to excessive torque. The balls move into guide slots to a position such that the balls are not in driving engagement between the clutch members. The clutch is intended to be uni-directional, that is the drive is always supposed to be in a single sense of rotation. Turning the drive in the opposite sense resets the clutch after disengagement.

In an aircraft flight control surface actuation system, there may be a requirement that a surface is locked in position when an excessive torque is generated, perhaps by a jam in the surface or its operating mechanism.

Where there is one actuator on a surface or the driving transmission serves only one surface, it may be acceptable for a "torque limiter" to apply a brake in response to excessive torque and thereby brake the surface and lock the transmission. However, if other surfaces are also driven by the transmission, it will be necessary to lock the surface experiencing the torque overload while allowing the transmission to rotate in order to drive the actuators of other surfaces. The locked surface must remain locked for the remainder of the flight.

According to the invention, there is provided a torque limiter comprising an input element, an output element, a clutch for transmitting torque between the input element and the output element, and a brake arranged to be applied to the output element in response to a torque exceeding a predetermined value prior to disengagement of the clutch, characterised in that, when the clutch is disengaged, the input element is completely disconnected from the output element and is free to rotate, and characterised by a latch for latching the brake in an applied state of the brake.

Preferably the input element and the output element define opposing plates of a ball or roller clutch. Each plate defines a series of recesses which, when the clutch is in a torque transmitting state, are aligned in pairs such that each pair of recesses engage opposing sides of a respective ball or roller. The input and output elements are biased into mutual engagement and are axially and rotatably movable with respect to each other.

Preferably at least one of the plates of the clutch is profiled to provide at least one ramp leading from the bottom of the recesses therein to the surface thereof such that the balls or rollers attempt to escape from the recesses when transmitting a torque between the input and output elements for one direction of rotation. The balls or rollers are arranged to escape from the recesses when the torque exceeds a predetermined value. The predetermined value is set by the bias urging the input and output elements into engagement. Preferably the face also has a plurality of escape pockets formed therein into which the balls or rollers which have escaped from the recesses are urged. The escape pockets are deeper than the recesses such that once a ball or roller is captured by an escape pocket it is prevented from transmitting torque between the input and output elements. Thus the clutch becomes permanently disengaged.

Preferably each recess on one of the clutch plates has two ramps provided for bidirectional operation.

Preferably the first and second plates also define opposing concentric grooves for holding a ball race therebetween which acts as a thrust bearing between the first and second plates when the torque transmitting balls are located in the escape pockets.

Advantageously the brake comprises a plurality of brake disks carried by the output element and arranged to be held against rotation with respect to the output element but able to perform limited axial motion with respect to the output element. The disks carried by the output element are interleaved with brake disks carried by a fixed element, such as the housing, which are held against rotation with respect to the fixed element but able to undergo limited axial movement with respect thereto.

Preferably the brake further comprises a profiled element movable past at least one latch such that once the profiled element has moved past the latch to engage the brake, it is held against movement in a brake releasing direction.

Advantageously the brake disks carried by the fixed element are biased towards the clutch, such that when an increase in transmitted torque over the predetermined value initially causes the first and second plates of the clutch to move away from each other, this motion causes the brake disks to be brought into engagement and to move against the urging of a brake spring so as to apply the brake to the output element. The operation of the brake further increases the torque acting at the clutch and causes the first and second plates to move further apart, thereby moving the profiled element past the latching element and latching the brake at the applied position.

In an embodiment of the present invention, the input element is an input shaft carrying an annular flange which defines a first clutch plate. The input shaft is rotatably held within a housing and extends therefrom. The input shaft is substantially inhibited from undergoing axial movement with respect to the housing. The output element comprises an output shaft and a second clutch plate. The second clutch plate is biased by a first compression spring towards the first clutch plate. A torque overload causes the second clutch plate to move away from the first clutch plate against the urging of the first compression spring due to the balls riding up the ramps. This initially causes the profiled element of the brake to push the brake disks into engagement. The friction between the disks cause the torque acting across the clutch to increase further and causes the balls to ride further up their ramps pushing the second clutch plate further away from the first clutch plate and thereby causing the profiled element to move past the latch and to move the interleaved disks against the urging of a second compression spring. The latch is then free to move to a latching position and the brake is held on. The increased torque also allows the balls to escape from their recesses formed in the first clutch plate but not from the recesses formed in the second clutch plate. Relative rotation between the clutch plates moves the balls into alignment with the escape pockets. The balls are pushed into the escape pockets and move out of torque transmitting engagement with the output element. The input shaft and the output shaft thereby become disengaged.

The present invention will further be described, by way of example, with reference to the accompanying drawings, in which.

Figure 1:
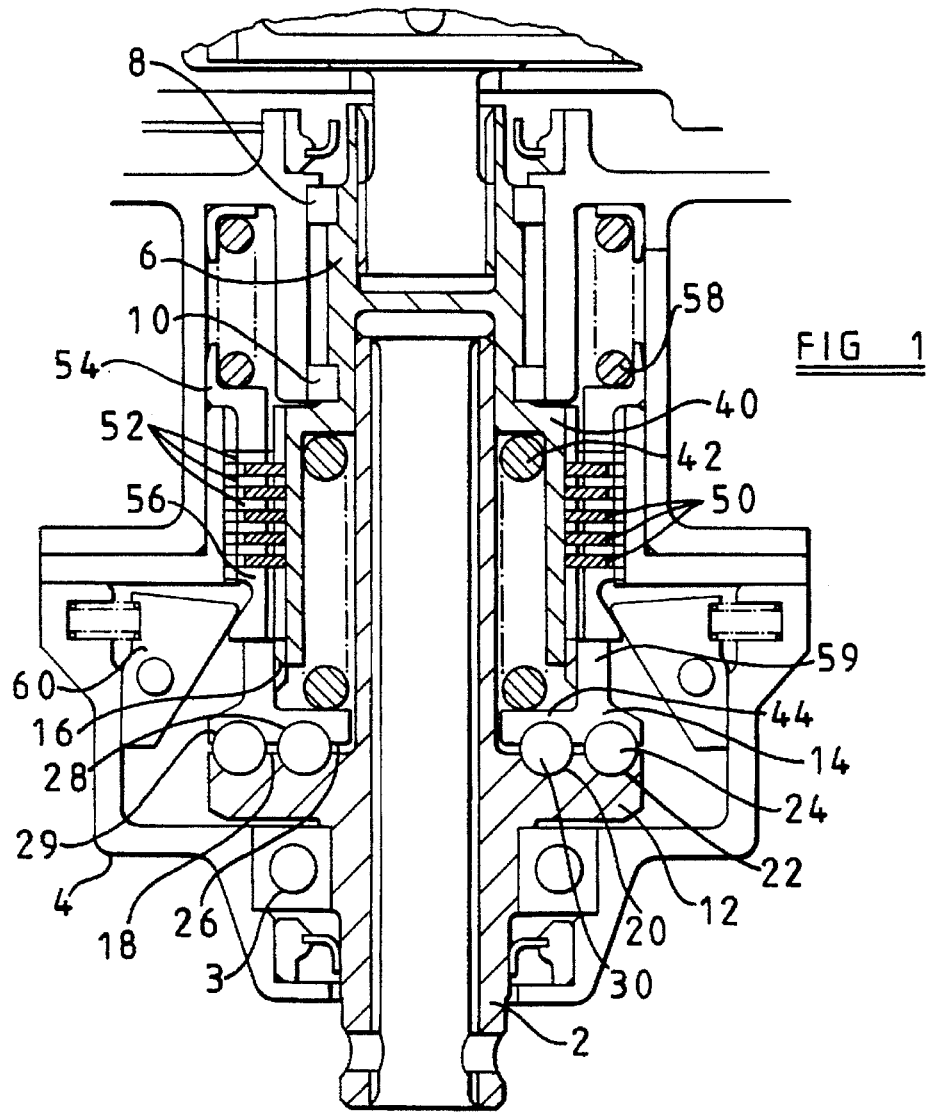
FIG. 1 is a cross section of a torque limiting device constituting an embodiment of the present invention.

The torque limiting device shown in FIG. 1 comprises an input shaft 2 rotatably supported by a first bearing 3 and extending from a first end of a housing 4. An output shaft 6 is rotatably supported by second and third bearings 8 and 10. The input shaft 2 has an annular first clutch plate 12 attached thereto. A second clutch plate 14 is concentric with the first clutch plate 12 and in driving engagement with the output shaft 6 via splines 16.

A first surface 18 of the first clutch plate 12 has a plurality of recesses 20 formed therein and an annular groove 22 which holds a ball race 24. Similarly, a first surface 26 of the second clutch plate 14 also has a plurality of recesses 28 formed therein and an annular groove 29. The recesses 28 and the groove 29 are each formed at the same radius as the corresponding recesses 20 and groove 22 in the first clutch plate. The ball race 24 acts as a thrust bearing between the first and second clutch plates 12 and 14, respectively. The recesses 20 and 28 are arranged to engage opposing sides of balls 30 so as to hold the balls within the recesses. The balls 30 act to transmit torque between the first clutch plate 12 and the second clutch plate 14.

The output shaft 6 has a stepped portion which serves to define a shoulder 40. A compression spring 42 is positioned against the shoulder 40 and arranged to push against a second surface 44 of the second clutch plate 14. The compression spring 42 acts to bias the second clutch plate 14 towards the first clutch plate 12 and thereby to cause the clutch plates to hold the balls 30 securely in the recesses 20 and 28.

The output shaft 6 carries a plurality of brake discs 50 attached thereto. The brake discs 50 engage the output shaft 6 via a spline thereon so that the brake discs 50 are held against rotation with respect to the output shaft 6 but are axially movable with respect thereto. The brake discs 50 are interleaved with further brake discs 52 which are in splined engagement with the housing 4. The brake discs 52 are held against rotation with respect to the housing 4 but are axially movable with respect thereto. The brake discs 50 and 52 are held between first and second brake elements 54 and 56, respectively. The first brake element 54 is urged towards the second brake element 56 by a compression spring 58. The second brake element 56 is in abutment with a rim 59 extending from the second side of the second clutch plate 14.

The second brake element 56 is arranged to co-operate with a plurality of spring loaded latches 60 such that the second brake element 56 can be moved upwardly as illustrated in FIG. 1 to move the element 56 to a position above the latches 60 but the latches then move radially inwardly to prevent the downward movement of the brake element 56.

Figure 2:
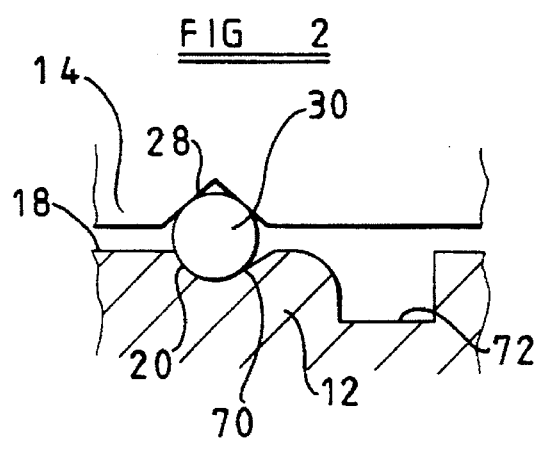
FIG. 2 is a schematic diagram of part of the clutch arrangement along a direction perpendicular to the plane of cross section of FIG. 1.

The recesses 20 formed in the first clutch plate 12 are not circularly symmetric. FIG. 2 shows a part-cross section at constant radius through the first clutch plate 12 at the mid-point of the first recess 20. The recess has a ramp 70 leading from the surface 18 to the bottom of the recess 20. The ramp enables the ball 30 to escape from the recess 20 in response to an excessive amount of torque being transmitted in one direction between the first and second clutch plates via the ball 30. The first clutch plate 12 further has a series of escape pockets 72 formed therein. When the ball 30 escapes from the recess 20 it is still held within the recess 28 (which has a different profile to the recess 20) and is swept towards the escape pocket 72 by the relative motion between the rotating first clutch plate (moving to the left as shown in FIG. 2) and the second clutch plate attached to the braked output shaft. Once the ball 30 aligns with the escape pocket 72, it drops into the pocket and becomes trapped therein.

Figure 3:
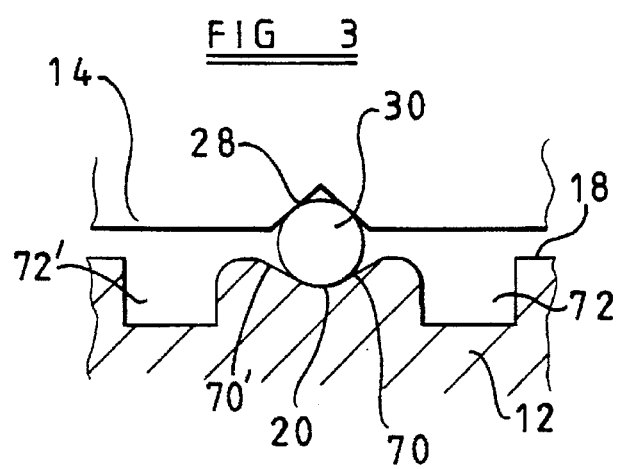
FIG. 3 is a schematic diagram of a further clutch arrangement along a direction perpendicular to the plane of cross section of FIG. 1.

FIG. 3 shows an alternative arrangement to that shown in FIG. 2. An additional ramp 70' is provided to the left of the ball 30. An additional escape pocket 72' is also provided. Thus excess torque in either sense of rotation will cause the ball 30 to ride up the relevant ramp 70 or 70' and be moved to and entrapped in the relevant escape pocket 72 or 72'. In a further torque limiter having bi-directional operation, the further escape pocket 72' may be omitted and the escape pocket 72 may be located equi-distantly between neighbouring first recesses 20 so that the total number of escape pockets is equal to the number of balls 30.

The operation of the clutches shown in FIGS. 2 and 3 is similar. The operation of the clutch shown in FIG. 3 will now be described.

Transmission of a torque between the first and second clutch plates tends to cause each ball 30 to attempt to ride up one of the ramps 70 or 70'. The compression spring 42 biases the second clutch plate towards the first clutch plate and this action opposes the escape of the balls 30 from the recesses 20. However, when the torque transmitted between the clutch plates 12 and 14 exceeds a predetermined value (set by the force supplied by the spring 42), the balls 30 ride up the ramps 70 or 70' and in so doing move the second clutch plate 14 away from the first clutch plate 12. The axial movement of the second clutch plate 14 causes the second brake member 56 to move upwardly as shown in FIG. 1 and to bring the brake discs 50 and 52 into engagement with one another. Engagement of the brake discs acts to hold the output shaft 6 against further rotation. This causes the torque acting between the first and second clutch plates to increase still further until such time as the second brake element 56 moves past the top of the latches 60 thereby causing the output shaft to become permanently braked. A further increase in torque across the clutch enables the balls 30 to escape completely from the recess 20 and be swept across the surface 18 of the first clutch plate until such time as each ball 30 aligns with a corresponding escape pocket 72 or 72'. The balls 30 fall into the escape pockets 72 or 72' under the urging of the compression spring 42 acting on the second clutch plate 14. The clutch plates remain separated from one another by virtue of the thrust bearing 24 but the balls 30 disengage from the recesses 28 in the second clutch plate and the clutch becomes permanently disengaged. Thus the input shaft 2 is free to rotate and the output shaft 6 is permanently braked and thereby held against further rotation.

The output shaft is arranged to deliver its drive to further elements via a spline thereon.

The torque limiter may be arranged to supply drive to an actuator for an aircraft control surface. The control surface may have more than one actuator driven from the same input transmission, for example, there may be two. In the event of a jam seen by one of the actuators first, the torque limiter brake of that actuator will lock the surface in position while allowing the transmission to continue to drive the second actuator on the surface. The asymmetric load on the surface may cause distortion of the surface and an increase in stiffness until the second actuator brakes the surface and the input drive is released. The torque limiting brake device needs to be disassembled in order to release the brake, and there is a danger that the distortion built into the surface by the separate braking of more than one actuator will cause difficulties in such disassembly.

In order to overcome these problems when a control surface is driven by a plurality of actuators, it is preferable that a torque limiter according to the invention is arranged to brake and latch both or all of the actuators in order to lock the surface in position and to disconnect the input to each of them while, if necessary, allowing the transmission drive to continue to serve other surfaces on the aircraft.

The brake is not restricted to being a set of friction elements as described hereinabove. A mechanical lock, for example, having interengaging dogs may be used. However, as before, the lock must be latched at the locked position.

It is thus possible to provide a torque limiter which disengages drive between an input and output shaft thereof when the torque exceeds a predetermined level and which permanently brakes the output shaft.

We claim:

1. A torque limiter comprising: an input element; an output element; a clutch for transmitting torque between said input element and said output element such that, when said clutch is disengaged, said input is completely disconnected from said output element and is free to rotate; a brake which is applied to said output element in response to a torque exceeding a predetermined value prior to disengagement of said clutch; and a latch for latching said brake in an applied state of said brake.

2. A torque limited as claimed in claim 1, in which said clutch comprises rolling elements and first and second plates biased towards each other and defining facing recesses containing said rolling elements.

3. A torque limiter as claimed in claim 2, in which at least one of said first and second plates defines pockets for receiving said rolling elements when displaced from said recess so as to disengage said clutch permanently.

4. A torque limiter as claimed in claim 2, in which said first and second plates define first and second concentric grooves containing further rolling elements to form a thrust bearing.

5. A torque limiter as claimed in claim 1, in which said brake comprises alternating first and second disks which are axially movable with respect to each other, each said first disk being rotationally fixed with respect to said output element and each said second disk being rotationally fixed.

6. A torque limiter as claimed in claim 1, in which said brake comprises an actuator element for applying said brake by moving past said latch and said latch comprises a latching element biased towards a latching position for preventing a return of said actuator element.

* * * * *